No. 753,890. PATENTED MAR. 8, 1904.
N. LANGFORD.
COMBINED COTTON CHOPPER AND CULTIVATOR.
APPLICATION FILED MAY 1, 1902.
NO MODEL. 2 SHEETS—SHEET 2.
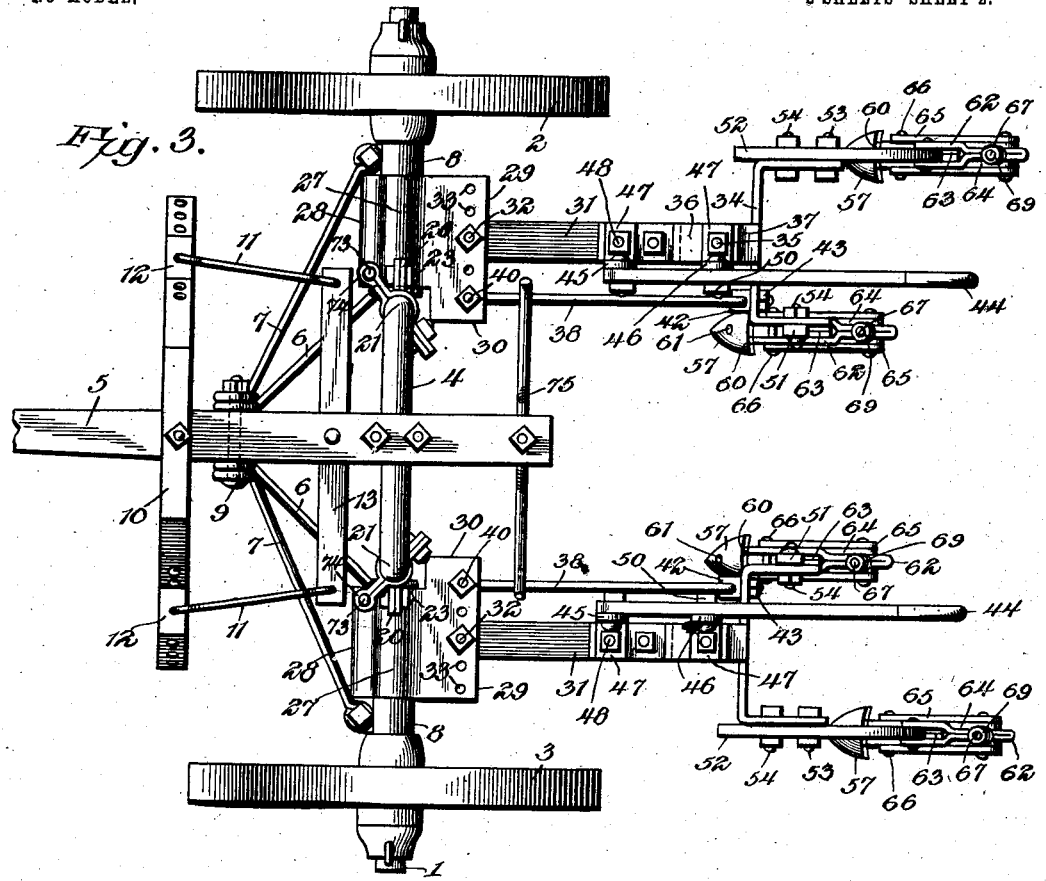
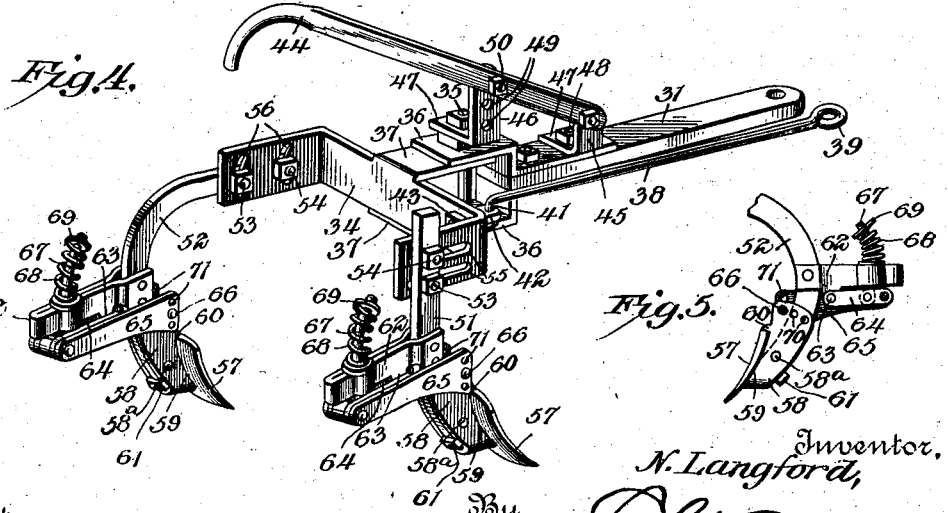
Witnesses
Howard D. Orr.
Louis G. Julihn
Inventor,
N. Langford,
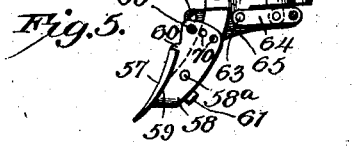
Attorney No. 753,890. Patented March 8, 1904.

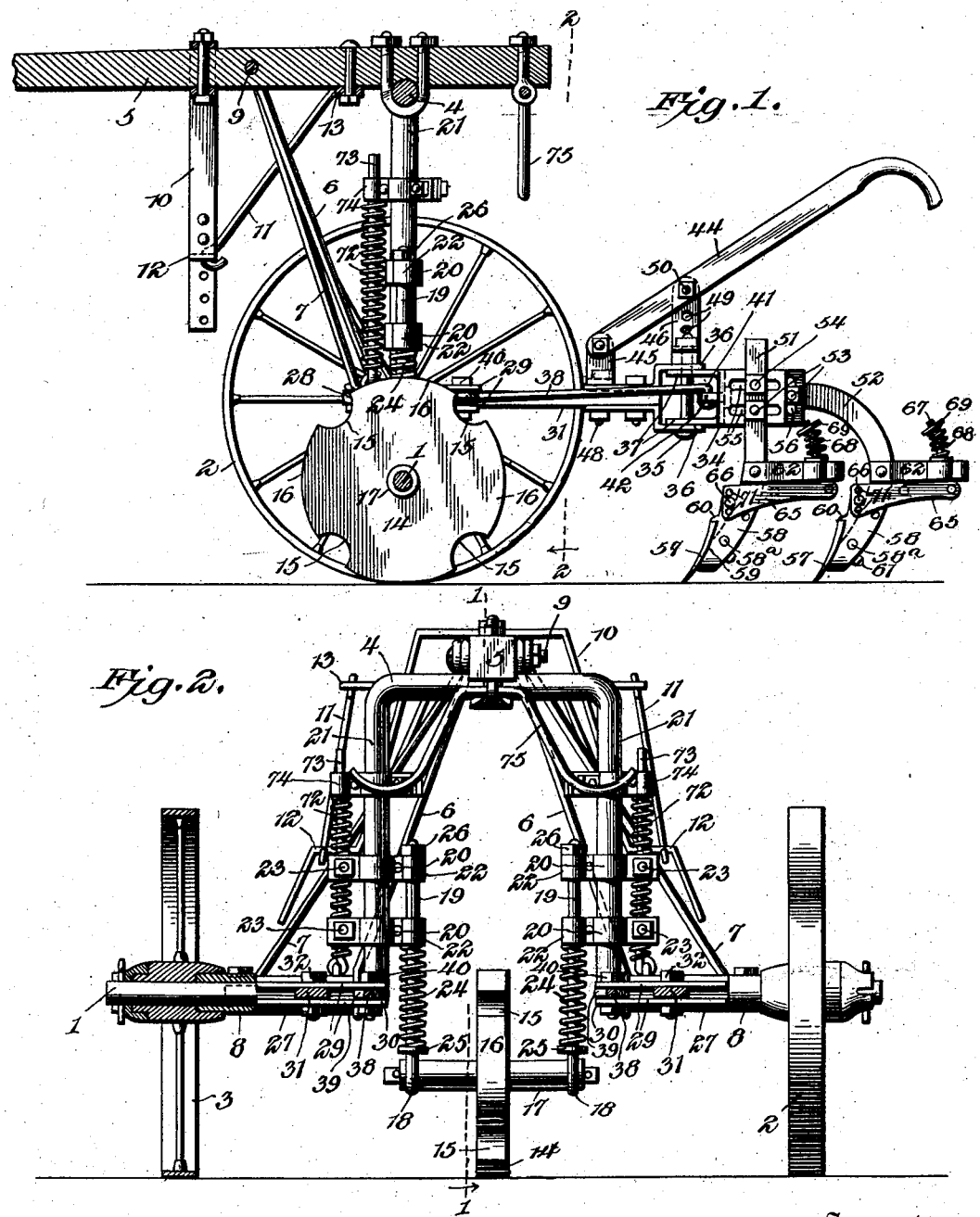

UNITED STATES PATENT OFFICE.

NOAH LANGFORD, OF TIDWELL, TEXAS.

COMBINED COTTON CHOPPER AND CULTIVATOR.

SPECIFICATION forming part of Letters Patent No. 753,890, dated March 8, 1904.

Application filed May 1, 1902. Serial No. 105,519. (No model.)

*To all whom it may concern:*

Be it known that I, NOAH LANGFORD, a citizen of the United States, residing at Tidwell, in the county of Hunt and State of Texas, have invented a new and useful Combined Cotton Chopper and Cultivator, of which the following is a specification.

My present invention relates to a combined cotton chopper and cultivator, and has for its primary object the production of a simple and effective implement for the simultaneous cultivation and chopping or thinning of the growing cotton-plants.

Further objects of the invention are to provide a convenient mounting of the chopper-disk in the arched frame of the machine; to provide for the relative adjustment of the side gangs of plows toward or from the row of plants without disturbing the relations of the plows of each gang; to provide a novel mounting for the front ends of the beams which will permit the convenient adjustment thereof; to arrange for the adjustment of the handles relative to the beams, so that said handles will be readily accessible when the beams are swung wide apart; to provide novel tension mechanism for the pivoted plow-shoes, which will permit the tension thereof to be regulated without changing the inclination of the plows, and to so connect the cross-heads and beams and the parallel bars that all lost motion incident to the wearing of the parts may be readily compensated for.

Further objects of the invention and other novel features of construction will appear during the course of the succeeding description of the illustrated embodiment of my implement.

In the accompanying drawings, Figure 1 is a longitudinal sectional view on the line 1 1 of Fig. 2. Fig. 2 is a transverse sectional view on the line 2 2 of Fig. 3. Fig. 3 is a top plan view of the complete implement. Fig. 4 is a detail perspective view of one of the plow-beams and a cross-head equipped with a side gang of plows and showing the mode of connecting the cross-head to the beam and the manner of adjusting the plow-handle, and Fig. 5 is a detail view showing the mounting of one of the plows and the means for resisting the yielding of the foot-piece carrying the same.

Like numerals of reference are employed to designate corresponding parts throughout the views.

The axle 1, supported by the usual carrying-wheels 2 and 3, is bent at its middle portion to form an upwardly-extending arch 4, to which is bolted the tongue 5, secured rigidly by braces 6 and 7, the braces 6 being secured to the axle at opposite sides of the arch and the braces 7 having connection with thrust-collars 8, secured upon the axle and receiving the side thrust of the carrying-wheels. The upper ends of these brace-rods are connected to the tongue at a point in advance of the arch, preferably by means of a common securing-bolt 9, in advance of which is bolted to the tongue a yoke-shaped bracket 10 for the attachment of the draft appliances. The bracket 10 is braced by brace-rods 11, connected at their lower forward ends to offset portions 12 of the bracket and at their upper rear ends to a bar 13, bolted to the tongue 5 immediately in advance of the arch 4.

The elevation of the arch 4 from the plane of the axle besides locating the tongue in the proper horizontal plane facilitates the mounting of the chopper-disk 14 at the center of the frame with its upper portion rising within the arch above the plane of the axle. The function of the chopper-disk is well understood; but it may be stated that said disk is provided with alternate notches 15 and plain segmental faces 16, the former being designed to clear and leave standing certain of the growing plants, while the latter—that is, the faces 16—are intended to crush down the plants intervening between those left standing by the notches. In accordance with my invention the chopper-disk is provided with an elongated hub 17, journaled at its ends in loop-bearings 18, formed at the lower ends of vertically-disposed bearing-rods 19, located within the arch and vertically movable in bearing-brackets 20, adjustably secured to the vertical bars 21 of the arch 4.

The brackets 20 may be constructed in any desired manner, but are preferably in the form of clips, each having at its inner end a bearing-collar 22 and at its outer end a clamping-bolt 23, designed to draw the ends of the clip together for the purpose of clamping the bracket or clip at the proper point. These bearing-brackets 20 are preferably disposed in pairs, so that the bearing-rods 19 will be afforded bearings at separated points in order to prevent lateral movement thereof.

It will be understood that the disk 14 must be mounted to yield vertically to accommodate it to the undulations of the ground and that the resistance opposed to such yielding must be capable of regulation in accordance with varying conditions of service. These ends I attain by supporting the disk from the lower ends of the vertically-movable rods 19 and by providing springs 24, resisting the elevation of the disk. These springs preferably encircle the bearing-rods and bear at their opposite ends against the lower brackets 20 and projections 25, extending from the rods 19 adjacent to the loop-bearings 18, said projections being preferably formed by rings or washers slipped upon the rods and resting upon the loop-bearings, as shown. The downward movement of the disk under the impulse of the springs 24 is limited by nuts 26, screwed upon the upper ends of the rods 19 and contacting with the upper brackets 20. The vertical yielding of the chopper-disk is thus resisted by the springs 24, and the tension of the latter is capable of regulation by the adjustment of the lower brackets upon the vertical side bars of the arch.

Viewed solely as a cotton-chopper the construction described is complete and operative; but since it is desired to cultivate the cotton as well as to thin the same and to cover with earth the cotton mashed down by the crushing-faces 16 of the disk I employ in connection with the construction described cultivating attachments comprising side gangs of cultivating-plows located in rear of the chopping-disk and adjustable laterally toward and from the row of plants.

At each side of the arch I mount upon the axle 1 a comparatively long split sleeve 27, formed with a projecting arm or flange 28, extending forwardly, and a pair of spaced parallel flanges 29, disposed rearwardly and having their inner ends 30 extended beyond the adjacent end of the sleeve. Between the flanges of each split sleeve 27 is retained the front end of a drag bar or beam 31, secured by a bolt 32, passed through the end of the beam and through correlative holes 33 in the flanges 29. These holes 33 are arranged in series endwise of the flanges to accommodate the lateral adjustment of the pivot of the beam 30, which pivot is formed by the bolt 32, disposed for reception within any pair of holes 33. At the rear end of each of the beams 31 is disposed a cross-head 34, carrying a gang of side plows in a manner to be described and pivotally connected to the beam by a vertically-disposed hinge-bolt 35, passed through overlapping bearing-plates 36 and 37, extending from the rear end of the beam and from the middle of the cross-head 34. In order to elongate the bearing for the purpose of overcoming lost motion, the bearing-plates 36 and 37 are preferably duplicated above and below the beam and cross-head, as shown in Fig. 4.

It will of course be understood that the pivotal mounting of the front ends of the beams 31 is designed to facilitate the swinging of the beams and the consequent lateral movement of the plows toward or from the row of plants being cultivated. It will therefore be apparent that unless otherwise provided the cross-heads will be thrown out of position and will not at all times remain parallel with the axle to properly dispose the cultivating-plows. I therefore associate what may be termed a "parallel" rod 38 with each of the cross-heads. Each of these rods is disposed parallel with the adjacent beam 31 and is pivotally connected at its opposite ends to a cross-head 34 and a split sleeve 27. At its front end each rod 38 is formed with an eye 39, engaging a bolt 40, passed through the holes 33 in the flanges 29, it being observed that the lateral adjustment of the pivots at the front ends of the beams 31 will be accompanied by a corresponding lateral adjustment of the bolts 40, constituting the pivotal connections between the front ends of the rods 38 and the bearing-sleeves.

The pivotal connection of the rear end of each bar 38 with the adjacent cross-head is effected by providing the bar with an angular extremity 41, engaging an eyebolt 42, passed through the cross-head to one side of the hinge-bolt 35 and retained by nuts 43. These eyebolts 42 are longitudinally adjustable, as shown, in order that lost motion incident to the wearing of the parts may be compensated for. When the beams are swung laterally by the operator, the parallel bars will compel the cross-heads to remain in parallel relation with the axle, and the cultivating-plows will therefore retain their proper operative positions and will not be twisted sidewise to the draft, as would be the effect were it not for the described arrangement of parts.

The manipulation of the beams by the operator is effected through the medium of handles 44, and attention is called to the fact that the mounting of these handles constitutes one of the features of the invention. It is ordinarily desirable to mount these handles at the outer sides of the beams, since in working up close to the row the mounting of the handles at the inner sides of the beam would bring them too close together for convenient manipulation by the operator. Under some conditions, however—as, for instance, in running out middles—it is necessary to throw the beams wide apart, thus separating the handles by too great an interval to permit the proper manipulation of the plows by the plowman. I therefore support each of the handles upon a pair of swiveled handle-supporting brackets 45 and 46, said brackets being of angular form and having their horizontal foot-plates 47 swiveled, respectively, upon a bolt 48, passed through the beam, and the hinge-bolt 35, connecting the beam with the cross-head. The bolt 35 will therefore be seen to constitute a retaining device for the handle-bracket 46, as well as a connection between the beam and cross-head. It will be seen that by turning the handle-brackets the vertical portions thereof, to which the handles are secured, may be disposed adjacent to the inner or outer sides of the beams, as may be desired. The inclination of the handles may be adjusted by providing the brackets 46 with a series of openings 49, through either of which the bolt 50, securing the handle to the bracket, may be passed.

Each cross-head is designed, as already stated, to support a gang of plows. The ends of each cross-head are therefore bent back into parallel relation, (see Fig. 4,) and to these bent or angular ends are connected the inner and outer plow-shanks 51 and 52, each adjustably retained by a pair of bolts 53 and 54, passed through slots in the ends of the cross-heads. The slots 55, accommodating the bolts of the inner shank, are disposed horizontally, while the slots 56 for the bolts of the outer shank are disposed vertically and are slightly arcuate. This character of connection will obviously permit any desired angular adjustment of the shanks to present the plows 57 at any desired inclination.

The manner of attaching the plows 57 to the plow-shanks and of regulating the resistance to the yielding of the plows involves a novel construction constituting a feature of the invention. At the lower end of each shank is pivotally mounted, as indicated at 58ª, a foot-piece 58, straddling the shank and provided upon its front face with a plow-seat 59, at the upper end of which is an abutment 60, disposed to engage the upper end of the plow to prevent the sidewise yielding of the latter when secured by a single bolt 61. The plow is intended to yield when opposed by an obstruction which would otherwise serve to derange the parts, and is therefore held in its normal position by mechanism comprising a fixed arm 62, extending rearwardly from the shank above the foot-piece and having pivoted to the under side thereof, as indicated at 63, a lever 64, to the rear end of which is pivoted in turn a link 65, pivotally connected to the upper end of the foot-piece 58 by means of a key 66. A guide-rod 67, secured at its lower end to the lever 64, extends through and above the fixed arm 62 and is encircled by a spring 68, bearing at one end against the arm 62 and at its opposite end against a nut 69, screwed upon the upper end of the rod 67.

It will appear that the rearward yielding of the plow will be resisted by the springs 68, inasmuch as said spring opposes the downward swinging of the lever 64, made necessary by the forward movement of the upper end of the foot-piece connected to said lever by the link 65. For the purpose of adjusting the connection between the foot-piece and the link 65 said elements are provided, respectively, with series of openings 70 and 71 for the reception of the key 66. It will be noted that the point of connection of the link with the foot-piece may thus be adjusted to regulate the resistance opposed to the yielding of the plow and that the plow will remain at any desired angle by reason of the adjustability of the shank.

The downward swinging of the plow-beams beyond a predetermined point is resisted by springs 72, encircling the guide-rods 73, secured at their lower ends to the forwardly-disposed flanges of the split sleeves 27 and guided at their upper ends in brackets 74, adjustably secured to the side bars of the arch 4. The tension of these springs may obviously be regulated by the adjustment of the brackets 74.

The support of the plow-beams in inoperative positions is attained by the provision of a double supporting-hook 75, depending from the rear end of the tongue 5, the opposite ends of which hook are designed to engage under the handles to hold the plow-beams elevated.

The operation of my device is as follows: As the implement is drawn over the field the chopper disk or wheel 14 will rotate, and the crushing-faces 16 thereof will mash down the young cotton in the intervals between the plants left standing by the notching of the disk at intervals. At the same time the plants will be cultivated by the side gangs of cultivating-plows, and the operator by skilfully manipulating these plows through the medium of the handles will cause the crushed vegetation to be covered, it being understood that the mere crushing down of the plants does not effect their destruction unless they are subsequently covered by the earth thrown up by the cultivator.

The lateral swinging of the plow-beams is permitted by the pivotal connection of their front ends with the axle through the medium of the split sleeves, and the parallel rods 38 will serve to retain the cross-heads in parallelism with the axle irrespective of the swinging of the beams. If now it should be desired to separate the plow-beams by a greater interval—as, for instance, in running out middles—the bolts 32 and 40 of the beams and parallel rods may be removed and the beams and rods shifted to the desired positions and resecured. If when this separation of the beams is effected the handles are disposed at the outer sides thereof and are too widely separated to permit the convenient manipulation of the plows by the operator, the handle-brackets may be turned to locate the handles at the inner sides of the beams, as shown in Fig. 3.

The inclination of the individual plows is adjusted by means of the bolts 53 and 54 engaging the slots in the cross-heads, and, as we have seen, the tension opposed to the rearward yielding of the plows is regulated by means of the links 65. When it is desired to employ the chopper alone or to transport the machine from one point of use to another, the plow-beams are elevated and the handles 44 hooked over the double supporting-hook 75. In the event of its being desirable to increase or diminish the resistance opposed to the upward movement of the chopping-disk it is simply necessary to shift the lower brackets 20 upon the sides of the arch.

It is thought that from the foregoing the construction and operation of my combined cotton chopper and cultivator will be clearly apparent; but while the illustrated embodiment of the invention appears at this time to be preferable I do not limit myself to the structural details defined, as, on the contrary, I reserve the right to effect such changes, modifications, and variations of the illustrated structure as may be properly embraced within the scope of the protection prayed.

What I claim is—

1. In an agricultural implement, the combination with an axle having a central arch, and a vertically-yielding chopper-disk suspended from the axle within the arch, of horizontally-swinging plow-beams supported by and extending from the axle at opposite sides of the arch, and plows carried by the beams.

2. In an agricultural implement, the combination with an axle having a central arch, and a vertically-yielding support mounted in and supported by the arch, of a chopper carried by said support, horizontally-swinging plow-beams extending rearwardly from and supported by the axle at opposite sides of the arch, and plows carried by the plow-beams.

3. In an agricultural implement, the combination with an axle having a central arch, of spring-urged bearing-rods mounted upon the vertical side portions of the arch, a chopper-disk carried by the rods, horizontally-swinging plow-beams extending rearwardly from the end portions of the axle beyond the opposite sides of the arch, and handles and plows carried by the beams.

4. In an agricultural implement, the combination with the wheels and axle, of a sleeve mounted on the axle, a cross-head and plows in rear of the sleeve, and a plow-beam having hinged connection with the cross-head and adjustable upon the sleeve toward and from the adjacent wheel.

5. In an agricultural implement, the combination with the wheels and axle, of a sleeve mounted on the axle, a cross-head and plows in rear of the sleeve, a beam having hinged connection with the cross-head, and adjustable upon the sleeve toward and from the adjacent wheel, a parallel rod having pivotal connection with the cross-head and with the sleeve, and means for adjusting the connection between the rod and sleeve to correspond with the adjustment of the beam.

6. In an agricultural implement, the combination with an axle and wheels, of a cross-head and plows, a beam having pivotal connection with the axle and hinged connection with the cross-head, a parallel rod also having pivotal connection with the axle, and an adjustable device carried by the cross-head and pivotally connected to the rear end of the parallel rod, to compensate for wear between the parts.

7. In an agricultural implement, the combination with an axle and wheels, of a sleeve mounted on the axle, a cross-head and plows in rear of the sleeve, a beam having pivotal connection with the sleeve and hinged to the cross-head, a parallel rod pivoted to the sleeve to one side of the beam, and an eyebolt adjustably retained by the cross-head and having pivotal connection with the rear end of the parallel rod.

8. In an agricultural implement, the combination with an arched axle and wheels, of sleeves mounted on the axle at opposite sides of the arch, cross-heads and plows in rear of the sleeves, beams connected at their opposite ends to the sleeves and cross-heads, means for adjusting the connection between the beams and the sleeves to present said beams at different distances from the wheels, and means for retaining the cross-heads in parallel relation with the axle.

9. In an agricultural implement, the combination with an axle and wheels, of a plow-beam extending rearwardly from the axle, a cross-head, a bolt effecting a hinged connection between the cross-head and beam, a handle-bracket swiveled upon the bolt, and adjustable independently of both the beam and head and a handle secured to the bracket.

10. In an agricultural implement, the combination with an axle and wheels, of a beam extending rearwardly from the axle, a cross-head and plows, a hinge-bolt connecting the cross-head and beam, angular handle-brackets carried by the beam and by said hinge-bolt, respectively, and a handle secured to the brackets, said brackets being adjustable to position the handle at either side of the beam.

11. In an agricultural implement, the combination with an arched axle and wheels, of sleeves mounted on the axle at opposite sides of the arch, said sleeves having forward extensions, bearing-brackets carried by the arch, guide-rods having flexible connection with the forward extensions of the sleeves and extended through the guide-brackets, springs encircling the rods and exerting a downward pressure upon the sleeve extensions, beams secured to and extending from the rear sides of the sleeves, plows carried by the beams, other bearing-brackets carried by the arch, bearing-rods movable in said brackets, and a chopper-disk carried by the lower ends of the bearing-rods.

12. In a device of the character described, the combination with a cross-head having parallel ends, of plow-shanks, and adjustable retaining means connecting the shanks to the ends of the cross-head and disposed to permit the angular adjustment of said shanks.

13. In a device of the character described, the combination with a cross-head having parallel ends, each of said ends having a pair of slots, plow-shanks imposed against the ends of the cross-head, and a pair of bolts passed through each shank and the slots at one end of the cross-head.

14. In an agricultural implement, the combination with an arched axle and wheels, sleeves mounted on the axle at opposite sides of the arch, said sleeves having forward extensions, bearing-brackets carried by the arch, guide-rods having flexible connection with the forward extensions of the sleeves and extended through the brackets, springs encircling the rods and exerting a downward pressure upon the sleeve extensions, beams secured to and extending from the rear sides of the sleeves, plows carried by the beams, and means for adjusting the beams upon the sleeves in a direction parallel with the axle.

In testimony that I claim the foregoing as my own I have hereto affixed my signature in the presence of two witnesses.

NOAH LANGFORD.

Witnesses:
J. W. CASTLEBERRY,
M. L. MOODY.